US005368663A

United States Patent [19]
Bold

[11] Patent Number: 5,368,663
[45] Date of Patent: Nov. 29, 1994

[54] PROCESS FOR PRODUCING PLATE-SHAPED BODIES MADE OF A MIXTURE OF PLASTER AND FIBROUS MATERIALS AND INSTALLATION FOR IMPLEMENTING

[75] Inventor: Jörg Bold, Kaiserslautern, Germany

[73] Assignee: Babcock BSH Aktiengesellschaft Vormals Buttner-Schilde-Haas AG, Krefeld, Germany

[21] Appl. No.: 972,493

[22] PCT Filed: Jul. 19, 1991

[86] PCT No.: PCT/EP91/01359

§ 371 Date: Feb. 8, 1993

§ 102(e) Date: Feb. 8, 1993

[87] PCT Pub. No.: WO92/03268

PCT Pub. Date: Mar. 5, 1992

[30] Foreign Application Priority Data

Aug. 15, 1990 [DE] Germany ............ 4025797

[51] Int. Cl.[5] ............ B32B 31/14

[52] U.S. Cl. ............ 156/39; 156/44; 156/45; 264/112; 264/128

[58] Field of Search ............ 156/39, 44, 45, 65; 264/40.3, 109, 112, 128

[56] References Cited

U.S. PATENT DOCUMENTS

| | | | |
|---|---|---|---|
| 4,417,931 | 11/1983 | Li | 264/128 |
| 4,840,688 | 6/1989 | Vogt | 156/45 |
| 4,942,003 | 7/1990 | Boyd | 156/39 |

FOREIGN PATENT DOCUMENTS

| | | |
|---|---|---|
| 0415184A2 | 8/1990 | European Pat. Off. . |
| 2581920 | 11/1986 | France . |
| 253545 | 11/1910 | Germany . |
| 2103931 | 8/1972 | Germany . |
| 2751466 | 5/1979 | Germany . |
| 3801315 | 7/1989 | Germany . |
| 3914106A1 | 10/1990 | Germany . |

*Primary Examiner*—Caleb Weston
*Attorney, Agent, or Firm*—Herbert Dubno; Yuri Kateshov

[57] ABSTRACT

Plasterboard is made by first spreading a mixture of plaster, fibers and water and then pressing this moist mixture to form the raw board. The upper and lower surfaces of the raw board are then wetted and the thus wetted raw board is pressed with a pressure less than the original consolidation pressure.

7 Claims, 6 Drawing Sheets

PROCESS FOR PRODUCING PLATE-SHAPED BODIES MADE OF A MIXTURE OF PLASTER AND FIBROUS MATERIALS AND INSTALLATION FOR IMPLEMENTING

CROSS REFERENCE TO RELATED APPLICATIONS

This application is a national phase of PCT/EP91/01359 filed Jul. 19, 1991 and based in turn upon German national application P 40 25 797.5 filed Aug. 15, 1990.

FIELD OF THE INVENTION

The invention relates to a process for producing plate-shaped bodies from a mixture of plaster and fibrous materials, comprising the following process steps:

a) preparing a wet mixture of plaster and fibers;

b) spreading the mixture to form a mat;

c) compressing the mat into a raw plate; and d) setting and drying the raw plate.

In addition, the invention relates also to an installation for implementing the process with a) a device preparing a wet mixture of plaster and fibrous materials;

b) a spreading device spreading the wet mixture onto a molding line to form a mat;

c) a press through which the mat lying on the molding line is passed in order to be compressed into a raw plate;

d) a setting station wherein the plaster in the raw plates sets; and e) a drying station wherein the set raw plates are dehumidified.

BACKGROUND OF THE INVENTION

A process and an installation of this kind are described in DE-OS 38 01 315. This publication describes the problems encountered when trying to set the water content of the wet plaster-fiber mixture and the possible solutions which have already been found. In the process described in DE-OS 38 01 315 the wetting of the mixture is carried out in two steps. A first portion of the required water is mixed into the dry mixture; the still spreadable mixture is then molded to a mat in several layers, similar to the process of producing pressed particle boards. The balance of the required water is then sprayed onto the individual layers of the spread mixture. The mat produced this way is then compressed into a raw plate in a press. The strength of the plates produced this way is very good, however it has been found that further improvement is possible.

OBJECT OF THE INVENTION it is the object of the present invention to an improved process and apparatus for producing plate-shaped bodies with higher strength can be obtained in a simple manner.

This object is obtained in the process of the invention in that between the process steps (c) and (d) (i.e. between compressing and drying the following further process steps take place:

e) subsequent wetting of the top and bottom faces of the raw plate; and f) subsequent compression of the subsequently wetted raw plates with a maximum pressure not exceeding the pressure used in process step (c), i.e. the original compression.

The process of the invention is based on the fact that a prewetted mixture after the first compression step at the highest pressure used in the total process is mechanically so stable that it is self-supporting. It is thus possible to further wet the bottom face. The subdivision of the total compression into two steps has various advantages:

The compression process which always also removes the air from the mat, is thus separated from the surface formation of the raw plate.

For the production efficiency of an installation it is always of particular importance that the air locked in the mat be expelled quickly and completely during compression. In practice this is achieved by using vent screens which are inserted between the press surfaces and the mat surface. As a result the pattern of the screens imprints itself on the surface of the raw plates and the imprint has to be subsequently removed by grinding, at least on one face. In the process of the invention it is possible to operate in the second compression step with a smooth press surface, instead of a screen. The water enrichment in the surface area of the raw plates causes a certain plasticity, so that the screen pattern can be substantially flattened during compression.

In the state of the art the plate-shaped body cannot be directly covered with a coating during its formation, because of the necessity to remove the air. However, in the second step of the process according to the invention, when air no longer has to be removed, it is possible to apply a coating. It only necessary to be certain that the plate-shaped body will still be able to dry out.

Advantageously the top and bottom faces of the raw plate are each subsequently wetted with 200 to 1000 $g/m^2$ of water. In process step (a) the humidity is preferably set at 22 to 28% water in relation to the dry mixture and the compression pressure in process step (f) ranges between 0.5 and 2 MPa.

The compression time in process step (c) can range between 10 and 20 sec. The water amount absorbed by the bottom face of the raw plate can be determined and the water amount fed to the top face of the raw plate can be established according thereto. Preferably the water amounts absorbed by the top face and the bottom face of the raw plate are equal.

The water amount absorbed at the top face of the raw plate, when considered with respect to the total mass of the raw plate, can be approximately 1 to 4% higher than the water amount absorbed at the bottom face of the raw plate. The bottom face of the raw plate can be subsequently wetted by spraying, while the raw plate is kept freely suspended.

Advantageously the wetting of the bottom face of the raw plate takes place while the raw plate is guided over a splash bath. Alternatively the subsequent wetting of the raw plate takes place through roller application.

The compression pressure in process step (f) can equal 50 to 100% of the compression pressure in process step (c). The compression time in process step (f) can range between 5 and 30 sec. and in process step (f) a periodically alternating compression pressure can be exerted.

With respect to the apparatus, between the press and the setting station the following are interposed:

f) an aftertreatment station, wherein the top and bottom faces of the raw plates are subsequently wetted; and g) a second press wherein the subsequently treated raw plates are subsequently compressed.

The advantages of the installation according to the invention correspond respectively with the already explained advantages of the process of the invention.

According to a feature of the invention, the subsequent wetting station for the bottom face of the raw plate comprises a lifting device capable to maintain and transport the raw plate freely suspended, as well as a multitude of nozzle through which the bottom face of the raw plate held by the lifting device can be sprayed. In each branch pipe leading to a nozzle a solenoid valve can be provided. The subsequent wetting station for the bottom face of the raw plate can comprise a multitude of containers which can be supplied with water and whose upper side provided with at least one passage opening is arranged immediately below the travel path of the raw plate. In each of the branch pipes leading to a container a solenoid valve can be provided which admits or stops the access of the water to the container. Each solenoid valve can be a three-way valve and in one of the positions opens the path from the inner space of the pertaining container to a drainage tank. The inner space of each container can be connected to an air blower. In each branch pipe leading from a container to the air blower a closable flap can be provided.

According to another feature at least one collecting tank is provided, wherein the excess water not absorbed by the bottom face of the raw plate is collected and from which the excess water flows into the measuring tank of a differential balance.

The subsequent wetting station for the bottom face of the raw plate can comprise an endlessly running, flat and absorptive material which runs through a water supply in a vat and which in a certain segment of its path is pressed against the bottom face of the raw plate which is travelling by. A pipe can be provided through which the vat is supplied with fresh water as well as an overflow through which the excess water flows from the vat into the measuring tank of a differential balance. An endless screen belt can hold and transport the raw plate in the subsequent wetting station for the bottom face of the raw plate. A roller can partially dip into the water supply in the vat and can be wrapped by the flat material. A pressure roller presses the flat material against the roller at the location where after passing through the water supply it leaves the roller, whereby the contact pressure of the pressure roller is adjustable.

The subsequent wetting station for the top face of the raw plate can comprise a multitude of nozzles through which the top side of the raw plate lying on a conveyor belt can be sprayed. In each branch pipe leading to a nozzle a solenoid valve can be provided.

Furthermore the subsequent wetting station for the top face of the raw plate is built analogously to the aftertreatment station for the bottom face of the raw plate.

The apparatus can comprise a control device which comprises a measured-value indicator (39, 239) for the water amounts absorbed by the bottom face of the raw plate and a measured-value indicator (42, 242) for the water amounts absorbed by the top face of the raw plate and keeps the two water amounts in a certain proportion with respect to each other by subsequent adjustment of the water amounts supplied to the top face of the raw plate. The measured-value indicator (139, 239) for the water amounts absorbed at the bottom face of the raw plate can be a differential gauge receiving the following:

the exit signal of a flow meter (38, 138, 238) measuring the water amount supplied to the bottom face of the raw plate; and the exit signal of a differential balance (29, 129, 229) whose measuring tank (28, 128, 228) collects the return flow of excess water coming from the bottom face of the raw plate.

The measured-value indicator for the water amount absorbed at the top face of the raw plate can be flow meter measuring the water amounts supplied to the top face of the raw plate. According to a further feature, the second press is a flat press, a roller press wherein a periodically alternating pressure is exerted on the raw plate, a smooth, entrained press plate, or a structured press plate.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
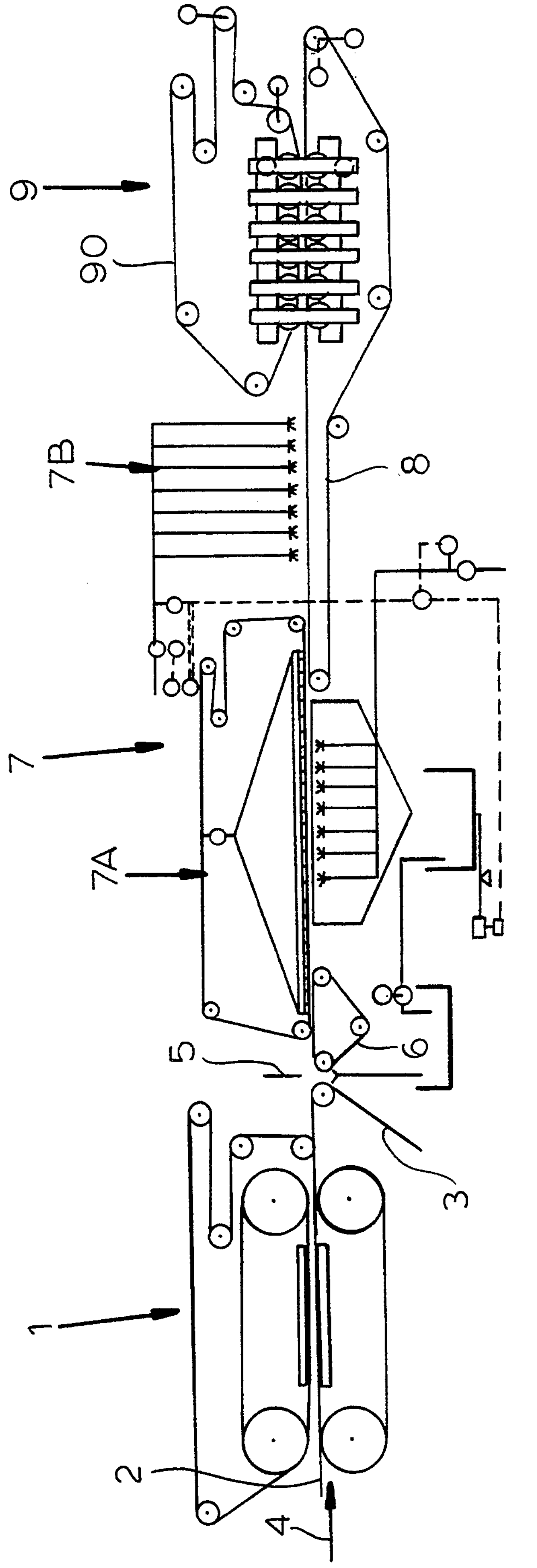
FIG. 1 is a section of an installation for producing plate-shaped bodies from a mixture of plaster and fibrous materials.

In FIG. 1 a continuously running band press 1 which operates correspondingly to the band press 46 of the already mentioned DE-OS 38 01 315. In order to more fully describe the process reference is made to this publication and especially to its FIG. 1 and the thereto pertaining description. In this connection it suffices to know that on a moving molding face 2, which comprises an endless molding belt 3 moving through the band press 1, mats consisting of a still loose mixture of plaster and fibers are fed in the direction of arrow 4. The water content ranges between 20 and 33% water, referred to the dry mixture. The mat is compressed in the band press 1 during a compression time between 10 and 20 s under a pressure of 1 to 2 MPa and finished at the edges in the following cutting device 5.

The raw plate is introduced into the subsequent wetting station bearing the general reference numeral 7 by a short transfer belt 6. Details of the subsequent wetting station 7 are described further below with the aid of FIG. 2. Now it suffices to know that the subsequent wetting station 7 is subdivided into a subsequent wetting station 7*a* wherein the bottom side of the raw plate is wetted and a subsequent wetting station 7*b* wherein the top side of the raw plate is wetted.

On a conveyor belt 8 the raw plate additionally wetted on its top and bottom faces reaches a continuously running roller press 9, wherein a further subsequent compression takes place. It will be understood that the plaster contained in the mass is also not fully set. In the roller press 9 an endless, smooth press belt 90 is entrained, so that a smooth surface of the raw plate results. It is helpful that the surfaces of the not yet fully set raw plates still maintain a certain plasticity after the wetting in station 7. The compression pressure in the roller press 9 ranges between 50 and 100% of the compression pressure in band press 1, but is not higher than the latter. Due to the construction of the roller press 9 the compression pressure alternates periodically.

Instead of roller press 9 it is also possible to use face presses, in which case the compression time should range between 5 and 10 seconds.

If a structured surface of the raw plate is desired, it is possible to fit a structured compression plate in the roller press 9.

The roller press 9 wherein the subsequent compression of the subsequently wetted raw plates takes place is followed by the usual installation sections, as known for instance from DE-OS 38 01 315. This means especially that a setting and drying stretch is provided. However these are not shown in the drawing.

Figure 2:
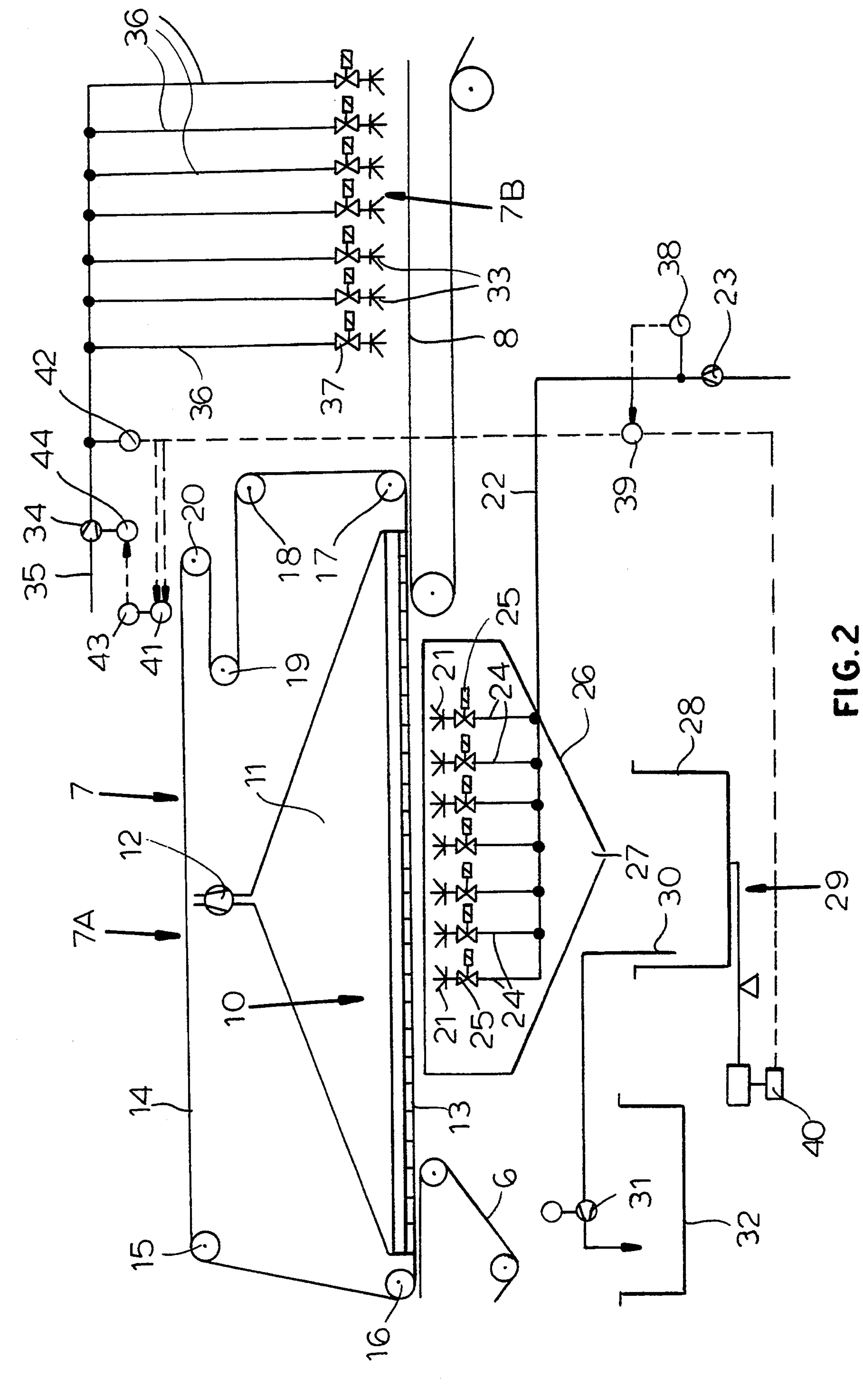
FIG. 2 is a section through the subsequent wetting station of the installation in FIG. 1 on a larger scale.

The details of the subsequent wetting station 7 can be better seen in FIG. 2 than from FIG. 1. The raw plate fed on the short conveyor belt 6 from the left in FIG. 2 is transferred to a lifting device 10 which is part of the subsequent wetting station 7A for the bottom side. The lifting device 10 comprises a funnel-shaped vacuum chamber 11 whose inner space is evacuated by a vacuum pump 12. The lower, flat frontal surface 13 is provided with a plurality of passage openings, against which the raw plate travelling by is held by suction.

An endless screen belt 14 is guided along the frontal surface 13 of the vacuum chamber 11 and around various guide rollers 15, 16, 17, 18, 19, 20. One of these guide rollers is driven, so that the screen belt 14 moves at the same pace as the raw plate held at the bottom side of the vacuum chamber 11.

The lifting device 10 is generally designed so that between the short conveyor belt 6 and the conveyor belt 8 whose left end can be seen in FIG. 2, the raw plate train moves freely while being suspended. The mechanical stability imparted to the raw plate in the band press 1 is sufficient for this purpose. In this way the bottom side of the raw plate is accessible and can be sprayed with water by a multitude of nozzles 21. The nozzles 21 are supplied with fresh water by a pump 23, via a water main 22 and branch pipes 24. In each branch pipe 24 a solenoid valve 25 is located, so that each nozzle can be turned on and off.

The water not absorbed by and dripping off the raw plate travelling past nozzles 21 is collected in a collecting tank 26. Through an opening 27 located at the lowermost end of the collecting tank 26 the excess water 27 reaches the measuring tank 28 of a differential balance 29. The excess water collecting in the measuring tank 28 is pumped at certain intervals by means of pump 31 via a pipe 30 into a drainage tank 32.

In FIG. 2 at the right end of the lifting device 10 the raw plate which has been additionally wetted on the bottom side is transferred to the conveyor belt 8. This transports the raw plate to the subsequent wetting station 7B for the top side. This subsequent wetting station 7B comprises a multitude of spray nozzles 33, directed towards the top side of the raw plate travelling by below them. The spray nozzles 33 are supplied with fresh water by a pump 34 via a main 35 and branch pipes 36. In each branch pipe 36 there is a solenoid valve 37, so that each spray nozzle 33 can be individually turned on and off.

The wetting of the top and bottom sides in the wetting stations 7A and 7B is adjusted so that the effective amount of water absorbed at the top and bottom sides are in a certain proportion with respect to each other, e.g. are basically identical. The shown control device is set for identical water amounts:

In the main 22 which supplies the fresh water for the subsequent wetting station 7A for the bottom side of the raw plate, a flow meter 38 is inserted. This produces an electrical signal corresponding to the amount of water supplied per unit time unit to the spray nozzles 21 and which is fed to the differential gauge 39. However, the quantity of water exiting the nozzles 21 is not completely absorbed by the passing raw plate; a part of this water drips back and is collected in the differential balance. A measured-value indicator 40 produces a signal which is representative for the amount of excess water returned into the measuring tank 28 per time unit. The output signal of the measured-value indicator 40 reaches a second input of the differential gauge 39, whose output signal corresponds to the difference between the water amounts supplied via main 22 and the water amount returning to the measuring tank 28 per time unit, i.e. the water amount absorbed by the bottom side of the raw plate in the initial wetting station 7A. The output signal of the difference gauge 39 is fed to a first input of a further difference gauge 41.

The amount of water supplied through the main 35 to the spray nozzles 33 of the subsequent wetting station 7B is determined by a flow meter 42. Since this water is sprayed onto the top side of the raw plate travelling under the nozzles 33, it can be assumed that the water is completely absorbed by the raw plate.

Thus the water amount detected by the flow meter 42 in the case of the subsequent wetting station 7B is directly equal to the quantity of water absorbed at the top side of the raw plate. The output signal of the flow meter 42 can be directly fed to the second input of the differential gauge 41. When the quantities of water absorbed per time unit by the bottom and top sides of the raw plate are equal, the output signals of the differential gauge 39 and the flow meter 42 coincide; the output signal of the differential gauge 41 is zero. However, if the quantities of water supplied through the main 35 to the spray nozzles 33 of the subsequent wetting station 7B differs from the calculated water quantity absorbed in the subsequent wetting station *7a*, at the output of differential gauge 41 an error signal is given. This is fed to a control unit 43 which in turn accelerates or decelerates the motor 44 of pump 34 in such a manner that the water amount measured by the flow meter 42 are brought to the desired value at which the output signal of the differential gauge 41 is again zero. In this way, the quantity of water supplied to the subsequent wetting station 7B for the top side of the raw plate follows the effective water amount absorbed by the bottom side of the raw plate in the subsequent wetting station 7A.

The above description of the control unit applied to the case when the same amount of water is to be absorbed by the top and bottom sides of the raw plate. If another proportion is desired, the differential gauge 41 has to be replaced by a corresponding logic circuit such as is known to the person skilled in the art.

Figure 3:
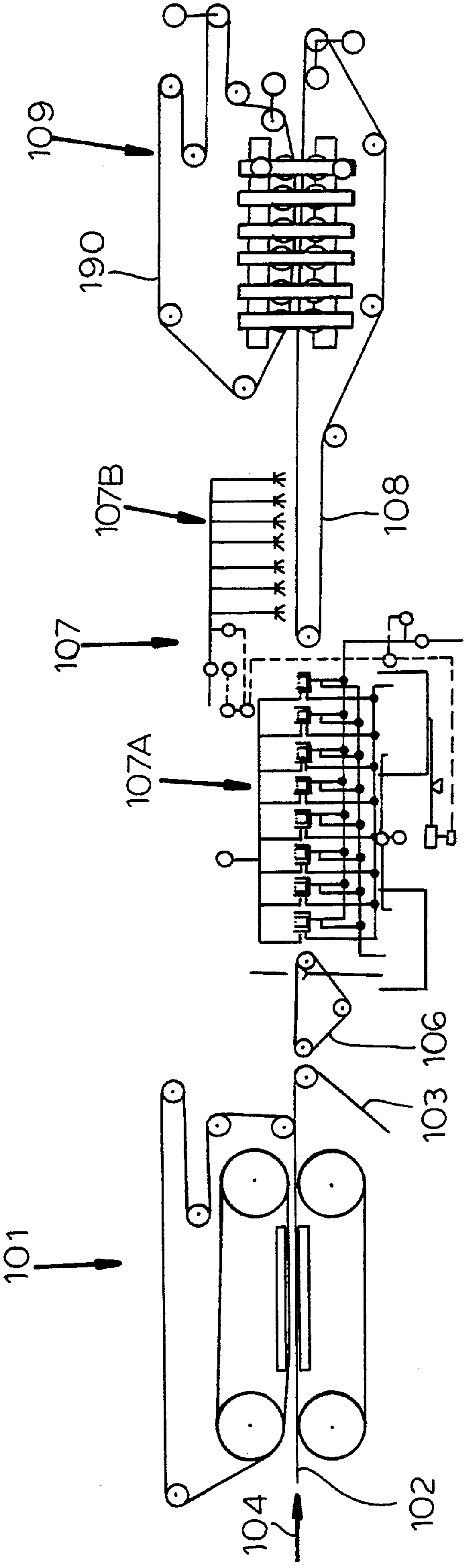
FIG. 3 is a longitudinal section through a second embodiment of an installation for producing plate-shaped bodies.

FIG. 3 shows a second embodiment of the installation for the production of plate-shaped bodies made of a mixture of plaster and fibrous material, which coincides largely with the embodiment shown in FIG. 1. For this reason corresponding part have been marked with the same reference numeral plus 100.

The continuously working band press 101, the forming face 102 with the forming belt 103, the short belt 106, the subsequent wetting station 107B for the top side of the raw plate inside the subsequent wetting station 107, as well as the roller press 109 serving for the setting compression of the raw plate are identical to the corresponding elements in the embodiment shown in FIG. 1, so that a renewed description can be dispensed with. The embodiments of FIGS. 1 and 3 are different from each other only with regard to the design of the subsequent wetting station 107A, which serves for the additional wetting of the bottom side of the raw plate. For further clarification reference is made to FIG. 4, which shows the subsequent wetting station 107 of the installation in FIG. 3 to a larger scale.

The subsequent wetting station 107A for the bottom side of the raw plate comprises a multitude of pot-like containers 150 whose perforated upper side is arranged immediately underneath the travelling path of the raw plate. Through a main 122 and branch pipes 124 fresh water is supplied to each of the containers 150 by means of a pump 123. In each branch pipe 124 an electromagnetically actuated three-way valve 125 is located. A branch pipe 151 leads from each three-way valve 123 to a collecting pipe 152 ending in a waste water tank 132.

Each container 150 is located inside a collecting tank 126, where the excess water not absorbed by the bottom side of the raw plate collects. Branch pipes 153 lead from each collecting tank 126 to a collecting pipe 154 ending in the measuring tank 128 of a differential balance 129.

Besides, each container 150 is also connected with an air blower 157 via a branch channel 155 and a collecting duct 156. In each branch duct 155 there is an electrically actuated flap 156, preferably a three-way flap with a throttle for maintaining a constant pressure, so that the air supply from the air blower 157 to each single container 150 can be separately turned on and off.

The subsequent wetting station 107A for the bottom side of the raw plate works as follows:

During normal operation the containers 150 (or a certain selection thereof—see below) are supplied with water by the pump 123 through the main 122 and the branch pipes 124 when the three-way valve 125 is set in the proper position. The water exits the perforations on the upper side of the container 150 in a surge directed towards the bottom side of the raw plate which is travelling by. The raw plate is carried by this water surge, so that it glides practically frictionless along the upper sides of the containers 150. Thereby it absorbs water in the desired manner at its bottom side. The excess water is caught by the collecting tanks 126 and guided into the measuring tank 128 of the differential balance 129 over the branch pipes 153 and the collecting pipe 154.

Since as described the water surge directed towards the bottom side of the passing raw plate serves at the same time as a sliding medium, the water amount supplied to the bottom side of the raw plate cannot be reduced at will in the pipe 122 by lowering the output of the pump 123. The total water amount is therefore established by the number of containers 150, which are respectively supplied with water. Which means that when a reduction of the water supply to the bottom side of the raw plate is desired, a certain number of containers 150 are separated from the water supply by closing the three-way valve 125. Since at these containers 150 which are no longer supplied with water the water surge serving as a sliding medium is absent, the water surge is replaced with an air surge or cushion. For this purpose, the pertaining valve 156 (which is closed in containers supplied with water) is opened. Obviously the arrangement is so that through all perforated upper sides of containers 150 are cushion of a flowing medium exits towards the bottom side of the travelling raw plate. The cushion medium can be ether water or air.

In order to switch from water to air in the individual container 150 the water still contained there can be evacuated over the branch pipe 151 and the collecting pipe 152 into the drainage tank 132 when the three-way valve 125 is in the proper position.

The subsequent wetting station 107B, which performs the additional wetting of the top side of the raw plate corresponds in its construction with the station in FIG. 2. Which means that the raw plate already wetted on its bottom side transported on the conveyor belt 108 is sprayed by a multitude of nozzles 133 supplied with fresh water by a pump 134 over pipe 135, branch pipes 136 and solenoid valves 137.

Figure 4:
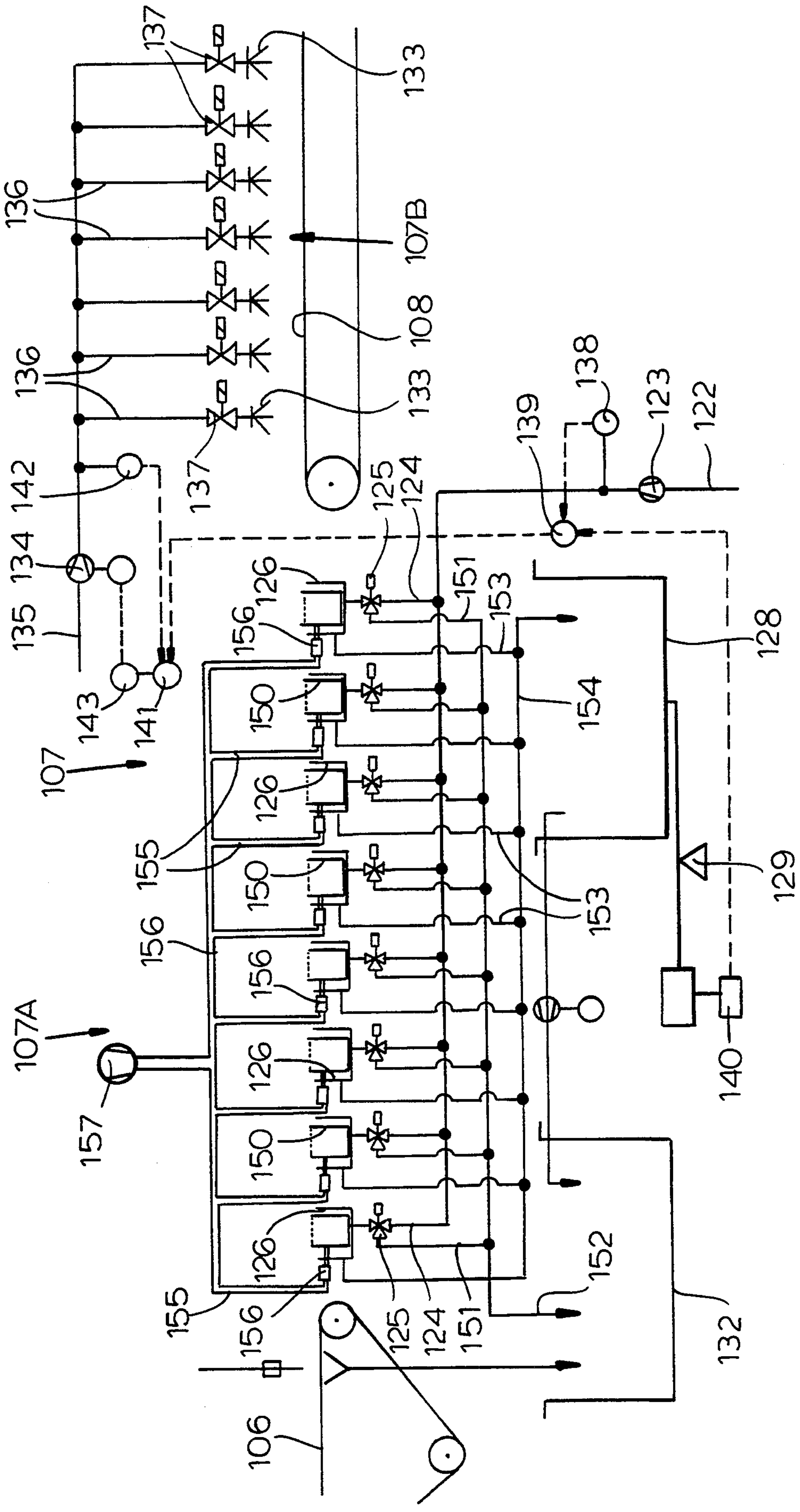
FIG. 4 is a section through the subsequent wetting station of the installation of FIG. 3 on a larger scale.

The control of the installation shown in FIG. 4 corresponds to the one of FIG. 2. In the differential gauge 139, by substraction of the signal standing for the amount of fresh water supplied through the main 122 as established by the flow meter 138 from the signal produced in measured-value indicator 140 of the differential balance 129 representing the backflow of the excess water, a signal is generated which corresponds to the amount of water absorbed at the bottom side of the raw plate. In the differential gauge 141, the difference between this signal and the signal generated in the flow meter 142 is produced, which is representative for the water amounts supplied through the pipe 135 to the spray nozzles 133 of the upper subsequent wetting station 107B.

In the desired ideal state of the installation this difference is zero, so that the control unit 143 does not have to intervene. However, if the water amount supplied to the top side of the raw plate in subsequent wetting station 107B differs from the one absorbed by the bottom side of the raw plate in the subsequent wetting station 107A, then by a corresponding adjustment of the output of pump 134 by the control unit 143 the desired situation is reinstated.

Figure 5:
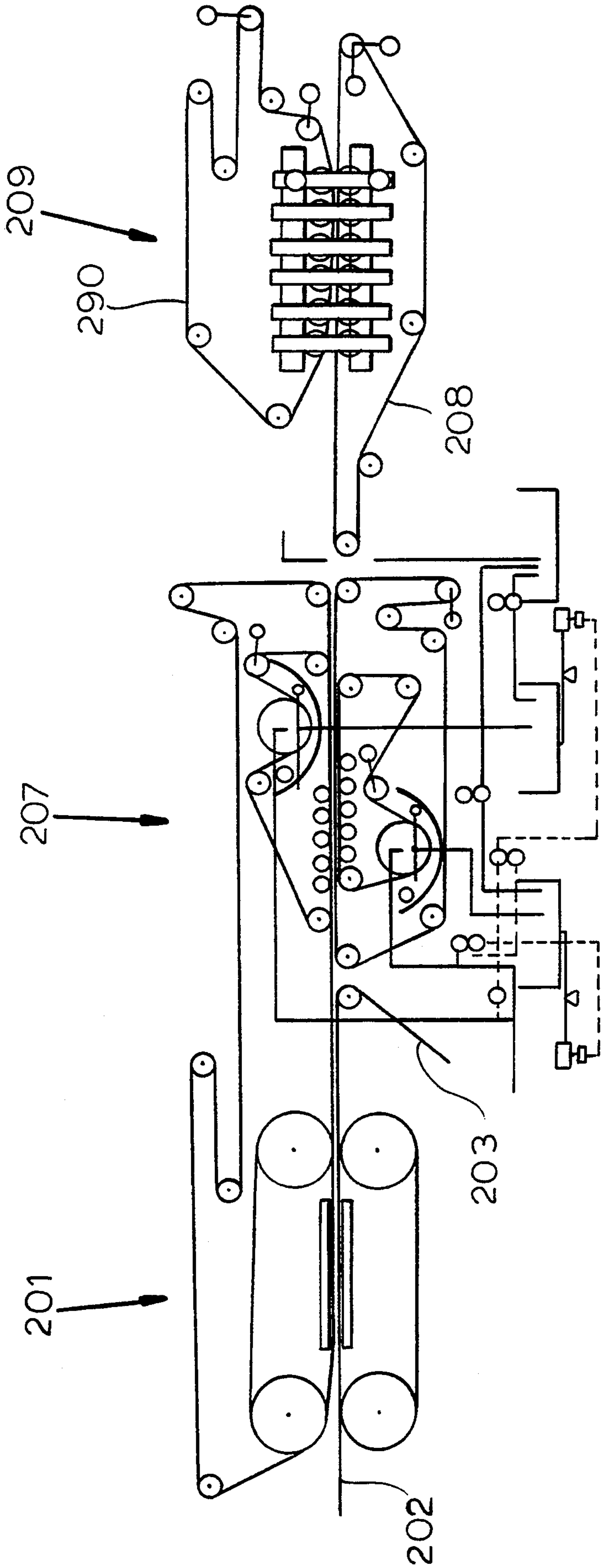
FIG. 5 is a longitudinal section through a third embodiment of an installation for producing plate-shaped bodies.

The embodiment of an installation for the production of plate-shaped bodies made of a mixture of plaster and fibrous materials shown in FIG. 5 is largely similar to the installation shown in FIG. 1. Corresponding parts are therefore marked with the same reference numerals plus 200.

Basically identical to the embodiment example in FIG. 1, in FIG. 5 are also found the continuously running band press 201, the molding face 202 with the molding belt 203, the conveyor belt 208, as well as the continuously working roller press 209. The differences between the various embodiment examples reside again in design of the subsequent wetting station 207.

Figure 6:
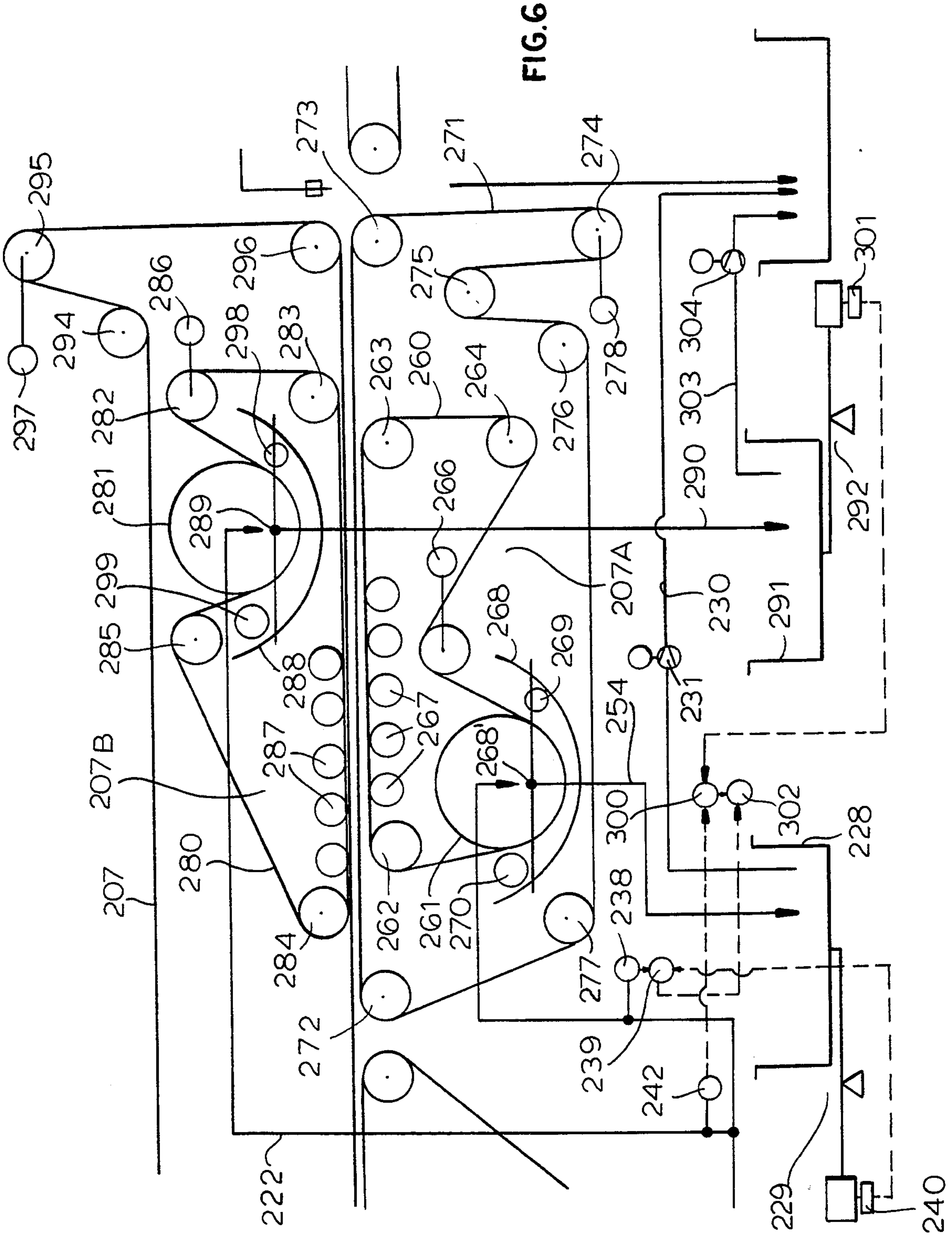
FIG. 6 is a sectional view of a subsequent wetting station of the installation in FIG. 5 on a larger scale.

With regard to the details of the subsequent wetting station 207 in FIG. 5 reference is made to FIG. 6 which shows this subsequent wetting station 207 at a larger scale. It can again be subdivided in a subsequent wetting station 207A for the bottom side of the raw plate and a subsequent wetting station 207B for the top side, which practically however are not staggered with respect to each other in the travelling direction of the raw plate, but are more or less arranged directly on top of one another.

The subsequent wetting station 207A for the bottom side of the raw plate comprises an endless felt cloth 260, which is wrapped around a cylinder 261, as well as guide rollers 262, 263, 264 and 265. Instead of felt cloth, any flat material can be used which is capable of absorbing water and then releasing it under pressure (e.g. a sponge cloth). The guide roller 265 is driven by a motor 266. Underneath the approximately horizontally running upper segment of the endless felt cloth, between the guide rollers 262 and 263, several pressure rollers 267 are provided.

The lower peripheral area of the cylinder 261 dips into the water supply which is kept at a certain level in a vat 268 by an overflow 268'. All guide rollers 262 to 265, the cylinder 261 and the pressure rollers 267 turn clockwise in such a manner that the felt cloth 260 turns approximately with the same speed as the raw plate to be treated.

Approximately at the point where the felt cloth 260 presses itself against the cylinder 261, a first pressure roller 269 is provided; a second pressure roller 270 is located at the point where the felt cloth 260 separates itself from the cylinder 261. At least the contact pressure of the pressure roller 270 against the cylinder 261 is adjustable. In this way the extent to which the felt cloth 260 leaving the cylinder 261 is squeezed out and still continues to transport water can be variable.

Fresh water is supplied to the inner space of vat 267 through a main 222. The overflow 268' of the vat 267 is connected via pipe 254 with the measuring tank 228 of a first differential balance 229.

In addition, the subsequent wetting station 207A comprises an endless screen belt 271, wrapped around the guide rollers 272, 273, 274, 275, 276 277. The guide roller 274 is driven by a motor 278 so that the screen belt 271 moves at the speed of the raw plate to be treated. The horizontal segment of the screen between the guide rollers 272 and 273 runs immediately above the horizontal segment of the filth cloth 260 between guide rollers 262 and 263 and above the pressure roller 267 and serves for the transport of the raw plate.

The modus operandi of the subsequent wetting station *207a* can be easily understood from the above: While the raw plate is moved on the screen belt 271 between guide rollers 272 and 273, the felt cloth 260, which previously was impregnated with a predetermined amount of water in the vat 267, presses against the bottom side of the plate under the pressure of pressure rollers 267. Thereby this water is transferred to the bottom side of the raw plate guided to pass by.

In its basic construction and modus operandi, the subsequent wetting station 207B for the top side of the raw plate corresponds to the subsequent wetting station 207A, whereby the differences consist only in having to take into consideration the effect of gravity. The subsequent wetting station 207A has also an endless felt cloth 280, guided around the cylinder 281 as well as the guide rollers 282, 283, 284 and 285. The guide roller 282 is thereby driven by a motor 286 so that all guide rollers revolve counterclockwise around the cylinder 281. The speed at which the felt cloth 280 moves corresponds with the moving speed of the raw plate.

At the horizontal segment of the felt cloth 280 between guide rollers 284 and 283 again several pressure rollers 287 are arranged, which correspond with the pressure rollers 267 of the lower subsequent wetting station 207A.

The cylinder 281 dips with its lower area into a water supply kept in the vat 288. The level of the water supply in vat 288 is determined by an overflow 289 which is connected via pipe 290 with the measuring tank 291 of a second differential balance 292.

The fresh water supply to the vat 288 takes place through the main 222.

To the upper subsequent wetting station 207B also pertains an endless screen belt 293 wrapped around guide rollers 294, 295, 296 and which in the represented embodiment example (compare to FIG. 5) is guided in one piece through the upper part of the band press 201. It is self-understood that it is also possible to use separate screen belts for the band press 201 and the upper subsequent wetting station 207B. The guide roller 295 is driven by a motor 297 in such a way that the upper screen belt runs at the speed of the raw plate. At the point where the felt cloth 280 presses itself against the cylinder 281, there is a first pressure roller 298; at the point where the felt cloth 280 leaves the cylinder 281, there is a second pressure roller 299. Through variations of the contact pressure at least of pressure roller 299, the humidity of the felt cloth 280 and thereby also the amount of water transferred to the top side of the raw plate in the subsequent wetting station 207B can be controlled.

Also in the embodiment shown in FIGS. 5 and 6, the water amounts supplied to the top and bottom sides of the raw plate are adjusted so that they correspond to each other. In detail this adjustment is performed as follows:

A first flow meter 238 detects the water flow per time unit in the main 222, thereby establishing the amount of water supplied to the vat 267 of the lower subsequent wetting station 207A. Its output signal is fed to a differential gauge 239. The first differential balance 229 determines the amount of excess water per unit time from the vat 267 of the lower subsequent wetting station 207A which was not absorbed by the bottom side of the raw plate. The measured-value indicator 240 of the first differential balance produces a corresponding output signal which is fed to the second input of the differential gauge 239. Thus the output signal of the differential gauge 239 is a direct measure for those amounts of water which were absorbed per unit time at the bottom side of the raw plate.

In a corresponding manner the flow meter 242 detects those amounts of water which are supplied through pipe 235 to the upper subsequent wetting station 207B. The second differential balance 292 determines those amounts of excess water flowing back per unit time from vat 288, i.e. not absorbed at the top side of the raw plate. In a differential gauge 300 the difference between the signals of flowmeter 242 and the measured-value indicator 301 of the second differential balance 292 is produced, which is representative for the amount of water per unit time absorbed at the top side of the raw plate.

The output signals of the differential gauges 293 and 300 are compared in a further differential gauge 302. If the water amount absorbed at the top and bottom sides of the raw plate are identical, the output signal of the differential gauge 302 is zero. If the absorbed amounts are different from each other, the signal produced by the differential gauge 302 can be used for triggering the readjustment. The readjustment takes place so that the contact pressure of one or both pressure rollers 270 and 299 is changed in the desired sense, until the amounts of water absorbed at the top and bottom sides of the raw plate coincide.

The measuring tanks 228, 291 of the first and second differential balance 229, 292 are emptied according to need into a drain tank 232, via pipes 230, 303 by means of pumps 231, 304.

With all of the described installations plaster/fiber boards are obtained, which at the same compression pressure have a considerably higher strength than the known plaster/fiber boards. Plaster/fiber boards according to the state of the art can be produced already at a lower pressure. This is particularly important when plaster/fiber boards are produced with an addition expanded perlite, in order to reduce the density of the raw plate. The density reducing effect of perlite decreases at the same time with the increase of the compression pressure to which it is subjected. In this sense, with the described installations and following the described process it is also possible to save raw materials.

I claim:

1. A process for producing plasterboard from a mixture of plaster and a fibrous material, comprising the steps of:
- (a) forming a moist mixture of plaster, fibrous material and water with the water content amounting 22 to 28% by weight of the dry mixture;
- (b) spreading said moist mixture to form a mat;
- (c) pressing said mat into a raw board with a pressure at least sufficient to compact said raw board into a coherent structure;
- (d) thereafter afterwetting an upper side and an underside of said raw board with 200 to 1000 g/m$^2$ of water;
- (e) afterpressing the afterwetted raw board with a pressure at least as high as a pressure applied in step (c);
- (f) thereafter setting and drying the afterpressed raw board; and
- (g) in the afterwetting of the upper side and underside of the raw board, initially determining an amount of water applied to said underside and thereafter adjusting the amount of water applied to said upper side in accordance with the amount of water applied to said underside.

2. The process defined in claim 1 wherein in the afterwetting of the underside of said raw board, said board is suspended and water is sprayed from below onto the underside of the suspended board.

3. The process defined in claim 1 wherein in the afterwetting of the underside of said raw board, said raw board is floated on a cushion of fluid including water.

4. The process defined in claim 1 wherein in the afterwetting of the underside of said raw board, water is rolled onto said underside of the raw board.

5. A process for producing plasterboard from a mixture of plaster and a fibrous material, comprising the steps of:
- (a) forming a moist mixture of plaster, fibrous material and water with the water content amounting to 22 to 28% by weight of the dry mixture;
- (b) spreading said moist mixture to form a mat;
- (c) pressing said mat into a raw board with a pressure at least sufficient to compact said raw board into a coherent structure;
- (d) thereafter afterwetting an upper side and an underside of said raw board with 200 to 1000 g/m$^2$ of water;
- (e) afterpressing the afterwetted raw board with a pressure at least as high as a pressure applied in step (c);
- (f) thereafter setting and drying the afterpressed board, the pressure applied to said raw board during afterpressing in step (e) being between 0.5 and 2 MPa and corresponding to 50 to 100% of the pressure applied in step (c).

6. The process defined in claim 5 wherein the pressure is applied during afterpressing in step (e) for a pressing duration between 5 and 30 seconds.

7. The process defined in claim 5 wherein the pressure is applied during afterpressing in step (e) as a periodically altering pressure.

* * * * *